United States Patent [19]

Saitoh et al.

[11] Patent Number: 4,819,169
[45] Date of Patent: Apr. 4, 1989

[54] SYSTEM AND METHOD FOR CALCULATING MOVEMENT DIRECTION AND POSITION OF AN UNMANNED VEHICLE

[75] Inventors: Hiroshi Saitoh; Kazunori Noso; Kunihiko Kurami; Norimasa Kishi, all of Kanagawa, Japan

[73] Assignee: Nissan Motor Company, Limited, Yokohama, Japan

[21] Appl. No.: 100,581

[22] Filed: Sep. 24, 1987

[30] Foreign Application Priority Data

Sep. 24, 1986 [JP] Japan .................. 61-223696
Oct. 21, 1986 [JP] Japan .................. 61-248334

[51] Int. Cl.$^4$ ............................. G06F 15/50
[52] U.S. Cl. ................... 364/424.02; 180/168
[58] Field of Search ............... 364/424; 180/167, 168, 180/169

[56] References Cited

U.S. PATENT DOCUMENTS 4,707,647  11/1987  Coldren et al. .............. 364/478 X
4,731,860   3/1988  Wahl ........................... 364/725 X Primary Examiner—Eugene R. LaRoche
Assistant Examiner—David Mis
Attorney, Agent, or Firm—Foley & Lardner, Schwartz, Jeffery, Schwaab, Mack, Blumenthal & Evans

[57] ABSTRACT

A system for calculating a movement direction and position of a movable object such as an unmanned vehicle running within a factory and a method therefor are disclosed in which an image pick up camera such as a video camera photographs a background of the movable object to generate a background two-dimensional image. Positions of vanishing point and side ends of a passage on which the movable object is to move are derived from the background photographed two-dimensional image. The movement direction of the movable object is derived from the detected vanishing point. Distances of the movable object from both sides ends of the passage are derived on the basis of the detected vanishing point and positions of side ends of the passage. The movement direction and position of the movable object thus detected are used to control movement of the movable object. The vanishing point is detected on the basis of edge directions at all points constituting and edge on the background two-dimensional image.

29 Claims, 12 Drawing Sheets

FIG.5
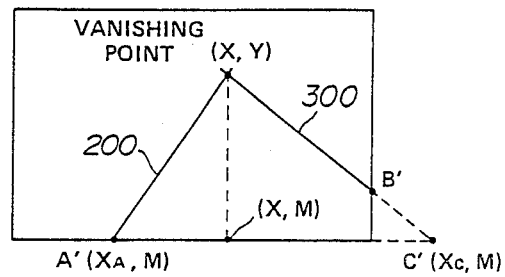
FIG.6
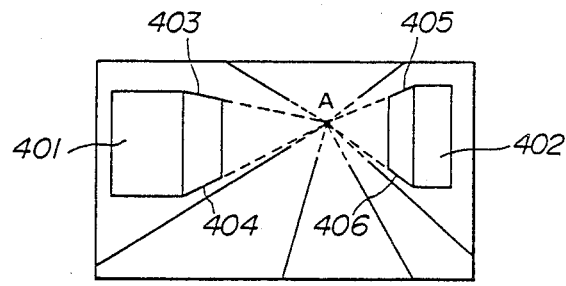
FIG.8 (A)  FIG.8 (B)
| "−1" | "0" | "1" |
|---|---|---|
| "−2" | "0" | "2" |
| "−1" | "0" | "1" |
301
| "−1" | "−2" | "−1" |
|---|---|---|
| "0" | "0" | "0" |
| "1" | "2" | "1" |
302

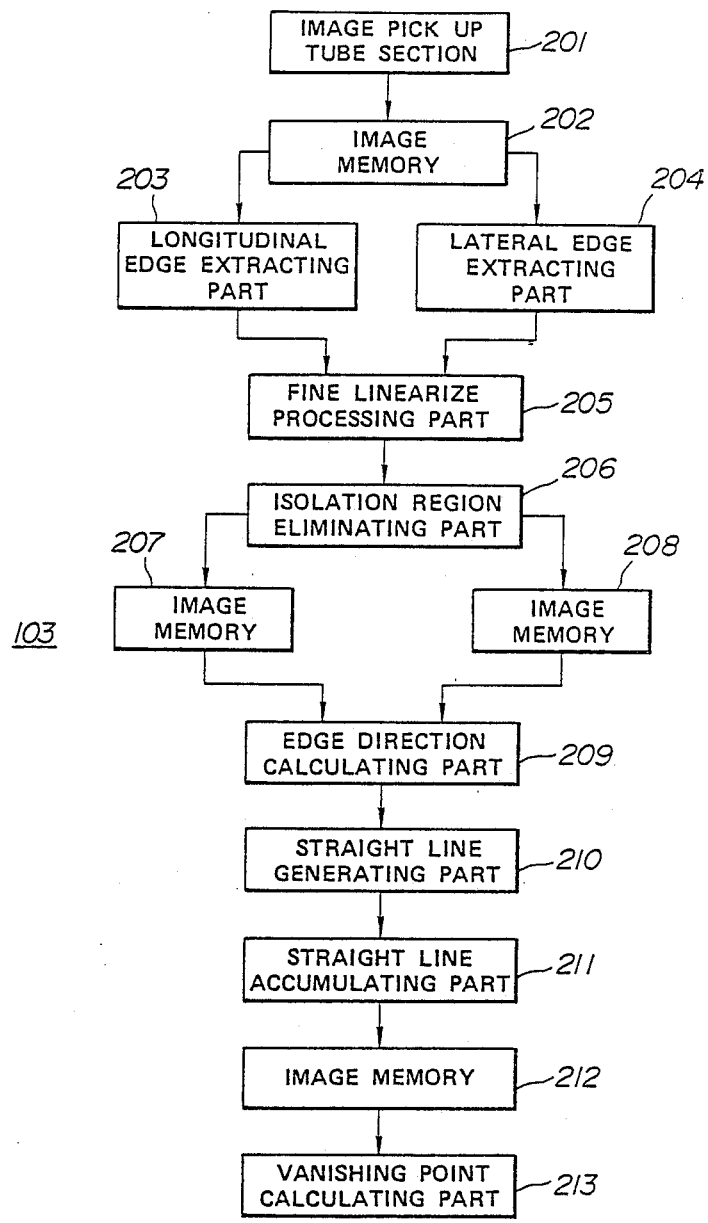

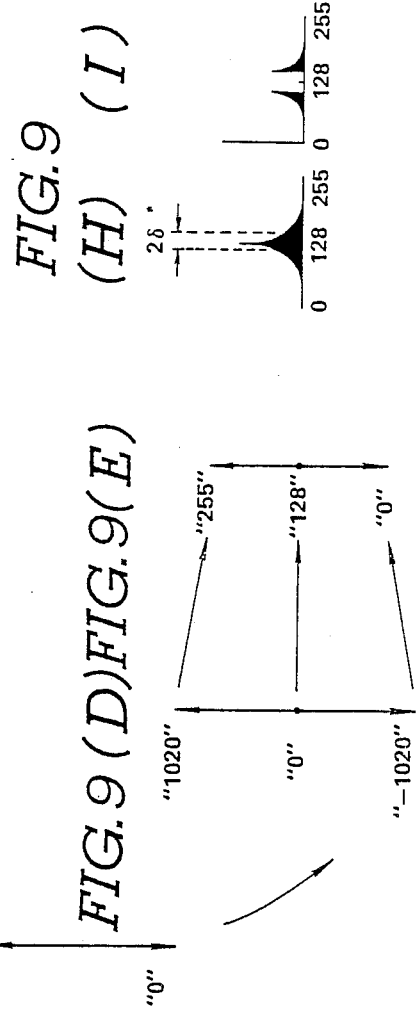

SYSTEM AND METHOD FOR CALCULATING MOVEMENT DIRECTION AND POSITION OF AN UNMANNED VEHICLE

BACKGROUND OF THE INVENTION

The present invention relates to a system and method for calculating a movement direction and position of an unmanned vehicle used in, e.g., a factory to carry out a running control for the unmanned vehicle.

Unmanned vehicles for automatically conveying various parts, materials, and so on have been used within limited spaces such as factories to move them from one working station to another therein.

A Japanese Patent Application First Publication Sho No. 60-17306 published on Jan. 29, 1985 exemplifies such a system for calculating the movement direction and position of the unmanned vehicle in which line-formed or spot-formed sensible markers are installed on a running road surface of a floor or wall surface and a photo-sensitive element and movement controller are installed in the unmanned vehicle to detect such markers and calculate the movement direction and position of the own unmanned vehicle.

However, since in such a system as disclosed in the above-identified Japanese Patent Application publication the markers need to be installed on the road surfaces (or ground surface) and wall surfaces, the markers need to be installed again on such places as described above when a layout inside the factory is changed or when a new part of factory is extended to the factory (extension of a scale of factory). In addition, environment maintenance against dirty and contamination is extremely troublesome.

SUMMARY OF THE INVENTION

It is an object of the present invention to provide improved system and method for calculating movement direction and position of an unmanned vehicle.

It is another object of the present invention to provide the system and method for calculating movement direction and position of the unmanned vehicle without necessity to install sensible markers for guiding the unmanned vehicle on required places in a factory when the change and/or extension of a layout of a factory in which the unmanned vehicle moves.

The above-described objects can be achieved by providing a system for calculating movement direction and position of a movable object, comprising: (a) first means for photographing a background of the movable object in a direction of which the movable object moves; (b) second means for detecting a vanishing point from a photographed background two-dimensional image derived by the first means; (c) third means for detecting a position of an end of a passage on which the movable object is to move from the photographed background image derived by the first means; (d) fourth means for calculating a direction of the movable object from a position of the vanishing point detected by the second means; and (e) fifth means for calculating a distance of the movable object from the position of the passage end detected by the third means on the basis of the detected position of the passage end and vanishing point.

The above-described objects can also be achieved by providing a system for calculating movement direction and position of an unmanned conveying vehicle automatically moving within a limited space, the system comprising: (a) first means for photographing a background of the limited space viewed from the unmanned vehicle in a direction of which the unmanned vehicle moves; (b) second means for detecting a vanishing point from a photographed background two-dimensional image derived by the first means; (c) third means for detecting positions of side ends of a passage on which the unmanned vehicle is to move from the photographed image derived by the first means; (d) fourth means for calculating a moving direction of the unmanned vehicle from a position of the vanishing point detected by the second means; and (e) fifth means for calculating each distance of the unmanned vehicle from the side ends of the passage detected by the third means on the basis of the detected positions of the side ends and vanishing point.

The above-described objects can also be achieved by providing a method for calculating movement direction and position of a movable object within a limited space, the method comprising the steps of: (a) photographing a background of the limited space viewed from the movable object in a direction of which the movable object moves; (b) detecting a vanishing point from a photographed background image derived in the step (a); (c) detecting positions of side ends of a passage on which the movable object is to move from the photographed image derived in the step (a); and (d) calculating a moving direction of the movable object from a position of the vanishing point detected in the step (b) and each distance of the movable object from the side ends of the passage detected in the step (c) on the basis of the detected positions of the side ends and vanishing point.

BRIEF DESCRIPTION OF THE DRAWINGS

FIG. 5 is a conceptional view representing a stored state of the passage end position.

FIG. 6 is an explanatory view for explaining a concept of a vanishing point.

FIG. 7 is a simplified functional block diagram of a vanishing point detecting section shown in FIG. 1.

FIGS. 8(A) and 8(B) are explanatory graphs of longitudinal and lateral edge extracting differential operators used to calculate a change in a density value in longitudinal and lateral edge extracting parts shown in FIG. 7.

FIGS. 9(A) to 9(I) are explanatory state diagrams of processings carried out in longitudinal and lateral edge extracting parts shown in FIG. 7, FIG. 9(A) showing a density range of a pixel before the edge extracting differential operator is acted. FIGS. 9(B) and 9(D) showing density ranges of a pixel after the edge extracting differential operator is acted, FIGS. 9(C) and 9(E) showing density ranges of a pixel after a density conversion is carried out, FIGS. 9(F) and 9(H) showing density histograms, and FIG. 9(G) showing a density histogram after a part which is low in an edge intensity.

DETAILED DESCRIPTION OF THE PREFERRED EMBODIMENT

Reference will hereinafter be made to the drawings in order to facilitate understanding of the present invention.

Figure 1:
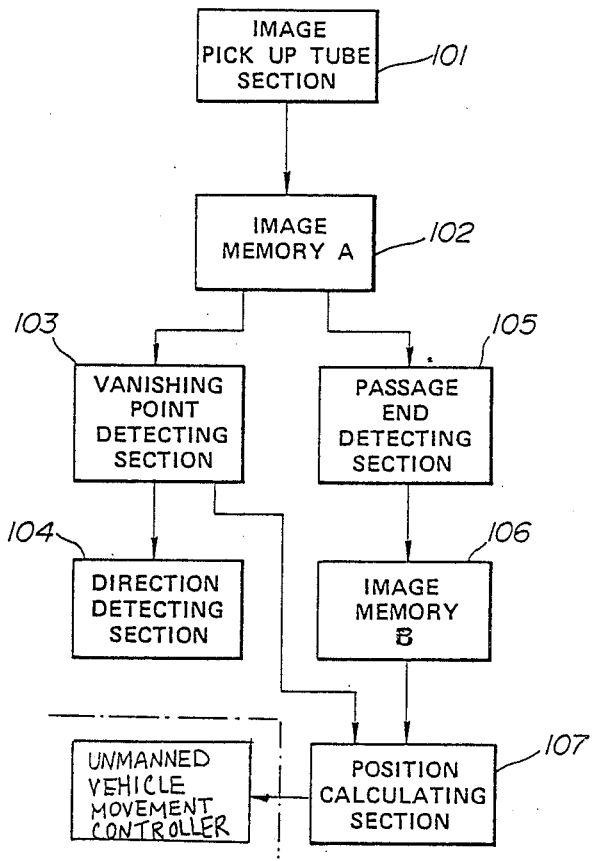
FIG. 1 is a simplified functional block diagram of a system for calculating movement position and direction of an unmanned vehicle in a preferred embodiment according to the present invention.

FIG. 1 shows a block diagram of a system for calculating movement direction and position of an unmanned vehicle in a preferred embodiment according to the present invention.

Some types of such conventional unmanned vehicles are exemplified by a U.S. Pat. No. 4,530,056 the disclosure of which is hereby incorporated by reference.

The unmanned vehicle movement direction and position calculating system includes: (a) an image pick up tube section 101, e.g., having a video camera: (b) an image memory A 102 for storing the picked up image; (c) a vanishing point detecting section 103 for detecting a position of a vanishing point of an observed image from the contents of the image memory A 102; (d) a direction calculating section 104 for calculating a direction of the unmanned vehicle from the detected vanishing point; (e) a passage end detecting section 105 for detecting a passage end position in the observed image from the contents of the image memory A 102; (f) an image memory B 106 for storing the detected passage end position: and (g) a position calculating section 107 for calculating a position of the unmanned vehicle using the detected vanishing position and passage end position.

It is noted that all sections denoted by 101 to 107 are installed within or on a predetermined part, e.g., a table of the unmanned vehicle.

It is also noted that the sections denoted by 102 to 107 in FIG. 1 are constituted by a computer having a storage unit.

Next, an operation of the whole system shown in FIG. 1 will be described below.

An image picked up from the image pick up tube section 101 is stored in the image memory A 102. Then, the stored image is supplied to the vanishing point detecting section 103 to derive the vanishing point position indicated by (X, Y). The position calculation of the vanishing point may be carried out through a method proposed by Kender using a Hough transform or alternatively a method proposed by Ohta et al in which the vanishing point derived from a ratio of area between two texture components in a screen. The details of detection of the vanishing point will be described later. The direction $\theta$ of the unmanned vehicle is calculated in the vehicle direction calculating section 104 using the calculated vanishing point position.

Figure 2A:
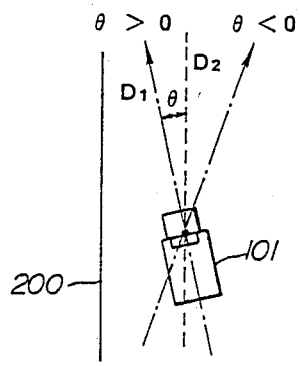
FIGS. 2(A) and 2(B) are schematic diagrams for explaining a theory of detection of the movement direction of the unmanned vehicle according to the present invention.
Figure 2B:
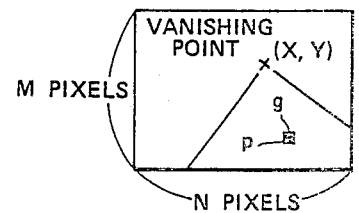

FIGS. 2(A) and 2(B) show explanatory views for explaining a theory of detection of the direction of the unmanned vehicle.

Suppose that in FIG. 2(A), $D_1$ is a movement direction of the unmanned vehicle and $D_2$ is a direction of the vanishing point and, in FIG. 2(B), an observed image is composed of N pixels × M pixels, a pixel size is p×q, a coordinate of the vanishing point position is (X, Y), and a focal distance of a lens (in a case where the image pick up camera section 101 is the video camera) is f, the movement direction $\theta$ of the unmanned vehicle (an angle of the movement direction $D_1$ with respect to the vanishing point direction $D_2$) can be calculated as follows.

$$\theta = \tan^{-1} \frac{q\left(X - \frac{N}{2}\right)}{f}$$

On the other hand, the passage end detecting section 105 calculates a position of the passage end on the basis of the contents of the image memory A 102.

Figure 3:
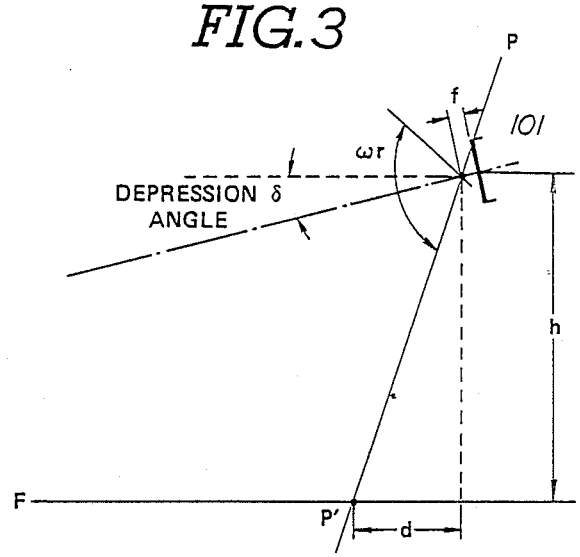
FIGS. 3 and 4 are schematic diagrams for explaining a theory of detection of a position of an end of a passage of the unmanned vehicle according to the present invention.
Figure 4:
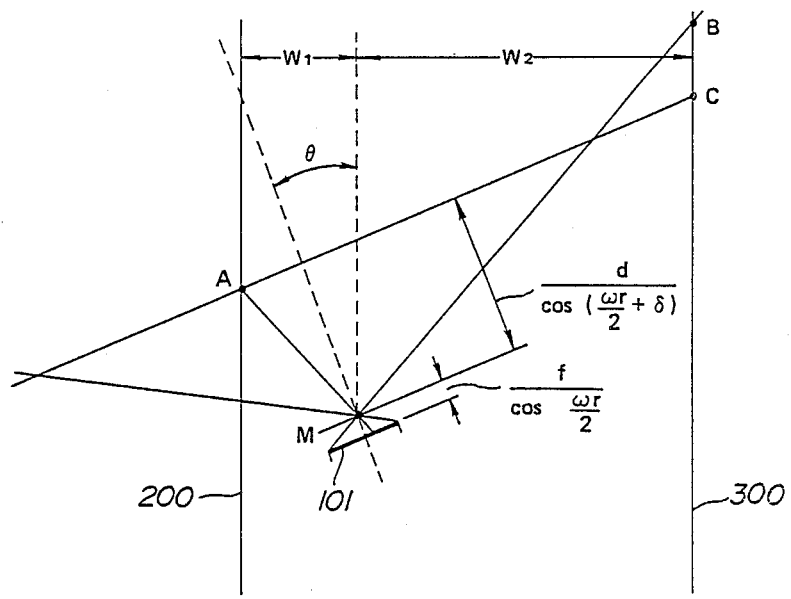

FIGS. 3 and 4 diagrammatically show the video camera constituting the image pick up tube section 101 viewed from a lateral side thereof and viewed from a top direction, respectively.

As shown in FIG. 3, suppose that a height of the video camera 101 with respect to a floor F is h, a depression of the camera angle is $\delta$ and a vertical picture angle of the camera lens is $\omega_r$. A distance d from an intersection between a line P-P' and the floor F to a vertical point on the floor extended from a lens focus M can be derived from the following equation.

$$d = \frac{h - f\sin\delta}{\tan\left(\frac{\omega_r}{2} + \delta\right)}$$

On the other hand, with the horizontal picture angle of the camera 101 taken into account, coordinates of the passage end positions A and B are calculated.

For example, the calculated coordinates of the passage end positions A and B are stored in the image memory B 106 in a form shown in FIG. 5.

The position calculating section 107 calculates a present position of the unmanned vehicle (a distance from the passage end) from the vanishing point position calculated by the vanishing point detecting section 103 and passage end position stored in the image memory B 106.

In details, the position calculating section 107 reads X coordinate $X_A$ and $X_C$ of points A' and C' in FIG. 5 to determine where the passage end position calculated by the passage end detecting section 105 is placed on a lowermost stage line of the image. The position calculating section 107, then, can calculate distances $W_1$ and $W_2$ of the unmanned vehicle to both passage ends 200 and 300 shown in FIG. 4 from the read X coordinates $X_A$ and $X_C$ using the following equations:

$$W_1 = \frac{q(X - X_A)(h - f\sin\delta)\cos\frac{\omega_r}{2}\cos\theta}{f\sin\left(\frac{\omega_r}{2} + \delta\right)}$$

$$W_2 = \frac{q(X_C - X)(h - f\sin\delta)\cos\frac{\omega_r}{2}\cos\theta}{f\sin\left(\frac{\omega_r}{2} + \delta\right)}$$

If the point C' is projected out of the image as shown in FIG. 5 due to a relationship between the position of the point C' and horizontal picture angle of the video camera 101, one of the passage ends 300 is extended out of the image and an intersection between the extended passage end 300 and the lowermost stage line of the image is derived. Consequently, the coordinate of the point C' can easily be read.

The movement direction and position data of the unmanned vehicle calculated in the way described above can be used, e.g., in an unmanned vehicle movement controller shown in FIG. 1 to control the movement including start and stop of the unmanned vehicle so as to continue to run on a line of passage separated by a constant distance from each left and right passage end.

Next, detailed construction and operation of the vanishing point detecting section 103 will be described with reference to FIGS. 6 to FIG. 18.

FIG. 6 shows a general concept of the vanishing point.

When a three-dimensional object is photographed in a two-dimensional image through a perspective projection method, an apparent distance between parallel edge lines 403 and 404 or 405 and 406 of rectangular solids 401 and 402 is decreased as the parallel edge lines becomes away from the camera and finally becomes perceptively zero. Such a zero point denoted by A in FIG. 6 is referred to as the vanishing point. That is to say, a technique of zero point (vanishing point) detection is a technique in which the vanishing point is detected from an apparent distortion generated as a result of photographing the three-dimensional object having a depth in a two-dimensional image and on the basis of the detected vanishing point, information on the three-dimensional object such as a gradient or direction of the object with respect to the camera is detected. Kender expressed a parameter of a linear equation in the two-dimensional image as a pseudo Hough transform plane by means of the Hough transformation. Since one straight line in a real image space is represented as a single point on the pseudo Hough plane, the vanishing point in the real image space can be determined by searching for the straight line on the pseudo Hough plane. Kender detected in this way the disappearing point A by carring out the further Hough transformation of the pseudo Hough plane to determine a straight line on the pseudo Hough plane. In this way, the vanishing point A was detected.

Ohta et al derived a distance ratio from a ratio of area when carrying out an affine transformation for two texture components within the screen so that the position of the vanishing point was determined. The method by Ohta et al is exemplified by a Japanese magazine named "Joho shori (Information Processing)" Volume 24, No. 12, pages 142 to 1427 published on December, 1983.

When the vanishing point is determined, a gradient of one plane of the three-dimensional object is determined. Thus, dimensional information on the three-dimensional object can be obtained from the two-dimensional image.

The above-described movement direction and position calculating system in the preferred embodiment according to the present invention has furthermore adopted a new method for detecting the vanishing point and calculating the position to be described below.

To carry out a speedy detection of the vanishing point, the vanishing point detecting section 103 includes basically as follows, edge extracting means extracts an edge information from the image photographed by means of the image pick up tube section 201 to calculate a direction of the edge, straight line generating and accumulating means generates a straight line on the basis of the calculated edge direction and accumulates it as a straight line accumulated image, and vanishing point calculating means detects a position which indicates a maximum accumulation value as the vanishing point from the accumulated straight line accumulated image.

FIG. 7 shows a detailed functional block diagram of the vanishing point detecting section 103 shown in FIG. 1. It is noted, however, that the image pick up tube section 201 and image memory 202 shown in FIG. 7 correspond to the sections denoted by 101 and 102 shown in FIG. 1, respectively.

The image pick up tube section 201, e.g., includes the video (television) camera for transforming light beams reflected from a three-dimensional object into a two-dimensional image signal.

A longitudinal edge extracting part 203 extracts a longitudinal component of an edge (hereinafter referred simply to as a longitudinal edge) from the two-dimensional image signal stored in the image memory 202.

A lateral edge extracting part 204 extracts a lateral component of the edge (hereinafter referred simply to as a lateral edge) from the two-dimensional image signal.

A fine linearization processing part 205 linearizes the edge extracted by the longitudinal and lateral edge extracting parts 203 and 204 into a fine line.

An isolation region eliminating part 206 eliminates isolation regions such as minute noises, short line segments from the two-dimensional image screen after the processing of the fine linearization.

An image memory 207 stores results of the fine linearization and isolation region elimination processed for the extracted longitudinal edge.

An image memory 208 stores results of the fine linearization and isolation region elimination processed for the extracted lateral edge.

An edge direction calculating part 209 calculates an edge direction for all points in the two-dimensional screen constituting the edge from the stored results in the image memories 207 and 208.

A straight line generating part 210 generates a straight line having a gradient of the edge calculated by means of the edge direction calculating part 209.

A straight line accumulating part 211 accumulates each straight line generated by the straight line generating part 210.

An image memory 212 stores an image of the accumulated straight lines.

A vanishing point calculating part 213 calculates the vanishing point position from the accumulated straight line image stored in the image memory 212.

It is noted that the vanishing point calculating part 213 is connected to the direction detecting section 104 and position calculating section 107, shown in FIG. 1.

Next, the detailed operation carried out in each part 203 to 213 will be described below.

The longitudinal edge extracting part 203 applies longitudinal edge extracting differential operators 301 shown in FIG. 8(A) to the two-dimensional image stored in the image memory 202 to derive a change in a density value in a lateral direction of the two-dimensional image. Next, the longitudinal edge extracting part 203 carries out a density transformation for the data on the density value change in the lateral direction. Furthermore, after the elimination of a portion which is weak in an edge intensity, a binary coding is carried out for the two-dimensional image to generate a binary coded longitudinal edge image.

Similarly, the lateral edge extracting part 204 applies lateral edge extracting differential operators 302 shown in FIG. 8(B) to the two-dimensional image stored in the image memory 202 to calculate a change in the density value in a longitudinal direction of the two-dimensional image. Next, the lateral edge extracting part 204 carries out the density transformation for the data on the density value change in the longitudinal direction. Furthermore, after elimination of a portion which is weak in the edge intensity, the binary coding is carried out for the two-dimensional image to generate the binary-coded lateral edge image.

The fine linearization processing part 205 carries out the fine linearization for a longitudinal edge image and lateral edge image derived by means of the longitudinal edge extracting part 203 and lateral edge extracting part 204, respectively, to extract substantially center lines of the longitudinal edge image and lateral edge image having certain widths. Consequently, an edge information having a width of "1" is retrieved. The fine linearization processing technique is well known. The details thereof will be omitted here.

The isolation region eliminating part 206 eliminates the isolation regions such minutes noises or short line segments from the fine linearized screen image by means of the fine linearization processing part 205.

Figure 10:
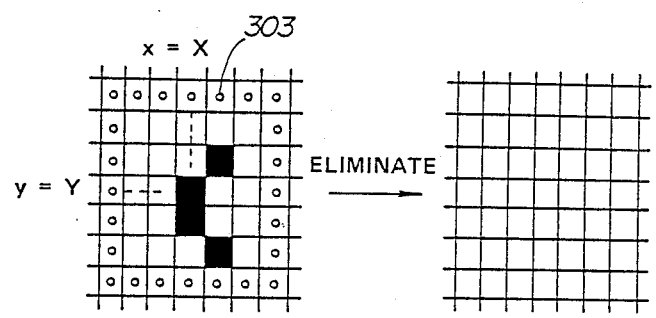
FIG. 10 is a schematic diagram for explaining a state of an isolation region eliminating processing.

For example, as shown in FIG. 10, a mask 303 expressed by (2n+1)×(2n+1) is set(in a case of the example of FIG. 10, n=3) and all pixel values within the mask 303 are replaced with "0"s when values of pixels at an outmost periphery of the mask 303 (denoted by circles in FIG. 10) indicate all "0"s.

The edge direction calculating part 209 calculates a gradient of the edge in each pixel from the binary-coded and fine-linearized longitudinal edge information and lateral edge information stored respectively in the image memories 207 and 208.

The straight line generating part 210 generates the straight line having the gradient calculated by the edge direction calculating part 209. The generation of the straight line is carried out by means of an algorithm called DDA (Digital Differential Analyzer). A general concept of the DDA is exemplified by a Japanese Publication titled "Zukei Syori Kougaku (Graphic Processing Engineering) Through a Computer Graphic Display" by Fuzio Yamaguchi published on Nov. 15, 1985. The generated straight line is accumulated in the straight line accumulating part 211 by adding "1" to an accumulated value before a passage point of the straight line. The accumulated result is stored in the image memory 212.

The vanishing point calculating part 213 determines one of the passage points of the straight lines accumulated by the straight line accumulating part 211 whose accumulated value is a maximum. That is to say, the vanishing point is a point at which the apparent distance between parallel lines of an object in a rectangular solid becomes reduced and finally zero as the camera is separated away from the object, when the rectangular solid object is photographed under the perspective projection method, and on which all parallel edge groups are concentrated under the perspective projection method. In a case of generally observed scenery, since points constituting the edge in a depth direction are great many (a parallel edge group contributing to the detection of the vanishing point is one), the vanishing point may be considered to be a single point. Hence, a point having a greatest accumulated value in the image memory 212 can be determined as the vanishing point.

Next, the whole operation of the vanishing point detecting section 103 will specifically be described below.

The two-dimensional image fetched from the image pick up camera section 201 is once stored in the image memory 202. Then the stored two-dimensional image is supplied to the longitudinal edge extracting part 203 and lateral edge extracting part 204.

The longitudinal edge extracting part 203 and lateral edge extracting part 204 calculate changes in density values of the two-dimensional image in the lateral and longitudinal directions by means of the longitudinal edge extracting differential operator 301 shown in FIG. 8(A) and lateral edge extracting differential operators 302 shown in FIG. 8(B), respectively.

If the two-dimensional image fetched from the image pick-up camera part (video camera) 201 is expressed as $h(x, y)$, the differential operators 301 in FIG. 8(A) are applied to the two-dimensional image $h(x, y)$ in the longitudinal edge extracting part 203 and its result can be expressed as follows.

$$h(x+1, y+1)+2h(x+1, y)+h(x+1, y+1)-h(x-1, y+1)-2h(x-1, y)-h(x-1, y-1)$$

Thus, the change in the density value in the x-axis direction (lateral direction of the two-dimensional image $h(x, y)$) can be derived.

On the other hand, in the case where the differential operators 302 in FIG. 8(B) are applied to the two-dimensional image $h(x, y)$ in the lateral edge extracting part 204, its result can be expressed as follows:

$$h(x-1, y-1)+2h(x, y-1)+h(x+1, y+1)-h(x-1, y+1)-2h(x, y+1)-h(x+1, y+1)$$

Thus, the change in the density value in the y-axis direction (longitudinal direction) of the two-dimensional image $h(x, y)$ can be derived.

It is noted that since the differential operators 301, 302, as shown in FIGS. 8(A) and 8(B), have asymmetrical values ("−1" to "1" and "−2" to "2") in the lateral and longitudinal directions, respectively, the results of "0" are given when they are acted upon parts having no change in the density values.

It is also noted that the change in the density value in the lateral direction derived in the longitudinal edge extracting part 203 represents an intensity of the longitudinal edge in the two-dimensional image and the change in the density value in the longitudinal direction derived in the lateral edge extracting part 204 represents the intensity of the lateral edge in the two-dimensional image.

If each pixel of the two-dimensional image stored in the image memory 202 has an 8-bit image information, a density range of each pixel is from "0" to "255" as shown in FIG. 9(A). If the differential operators 301, 302 shown in FIGS. 8(A) and 8(B) are acted upon the two-dimensional image, the edge intensity range is from "−1020" to "1020" as shown in FIGS. 9(B) and 9(D).

It is noted that FIGS. 9(B), 9(C), 9(F) and 9(G) are concerned with the longitudinal edge extracting part 203 and FIGS. 9(D), 9(E), 9(H) and 9(I) are concerned with the lateral edge extracting part 204. However, since the edge intensity range shown in FIGS. 9(B) and 9(D) is not a tone suitable for the image processing, the density transformation is carried out for the edge intensity range shown in FIGS. 9(B) and 9(D) to compress the edge intensity range to the range of "0" to "255". That is to say, suppose that an output of the edge extracting part 203 or 204 after the differential operators are applied to the two-dimensional image h(x, y) temporarily stored in the image memory 202 is F(x, y). Then, the output expressed by F(x, y) is transformed through the density transformation to suit to the tone for the image processing into the following:

$$\hat{F}(x, y) = (F(x, y) + 1024)/8$$

The value of "1020" in the intensity range of the longitudinal edge and lateral edge is compressed to "255", the value of "0" in the intensity range is compressed to "128", and the value of "−1020" in the intensity range is compressed to "0". Consequently, such images having histograms as shown in FIGS. 9(F) and 9(H) can be obtained by the parts 203 and 204, respectively. As shown in the histograms of FIGS. 9(F) and 9(H), images in the vicinity of the edge intensity range of "128" after the density transform are great many. However, the images in the vicinity of the range "128" are weak in the edge intensity such as patterns on a floor surface or noises.

Therefore, the longitudinal edge extracting part 203 and lateral edge extracting part 204 set the density values of the pixels within a range from "128−8" to "128+8" of the edge intensity to all "0"s. Consequently, a part of the density range which is weak in the edge intensity is eliminated as shown in FIGS. 9(G) and 9(I).

The edge information derived in the way described above is binary coded through a predetermined threshold value, e.g., the edge intensity range value of "128" to convert the edge information into an edge information of binary-coded digital value comprising only "0" or "1".

The binary-coded edge information by means of the longitudinal edge extracting part 203 and lateral edge extracting part 204 has a width more than required with respect to an actual edge. Therefore, the fine linearization processing part 205 carries out the fine linearization for all edges having the width of "1".

Since the fine-linearized edge information by means of the fine linearization processing part 205 includes isolation regions such as extremely short line segments and noises which are left after the elimination of the weak parts in the edge intensity, the isolation region eliminating part 206 eliminates these isolation regions due to no contribution to the detection of vanishing point position and ill effect on the detection accuracy thereof.

The isolation region eliminating part 206 replaces the pixel values within the mask 303 with all "0"s when values of pixels located on the outmost periphery of the mask 303 expressed as $(2n+1) \times (2n+1)$ as shown in FIG. 10 indicate all "0"s. When the mask 303 is applied to a point (x, y) at which the isolation region is determined to be present with the point (x, y) as a center, the pixel values of the isolation region within the mask 303 indicate all "0"s so that the isolation region can be eliminated.

Figure 11:
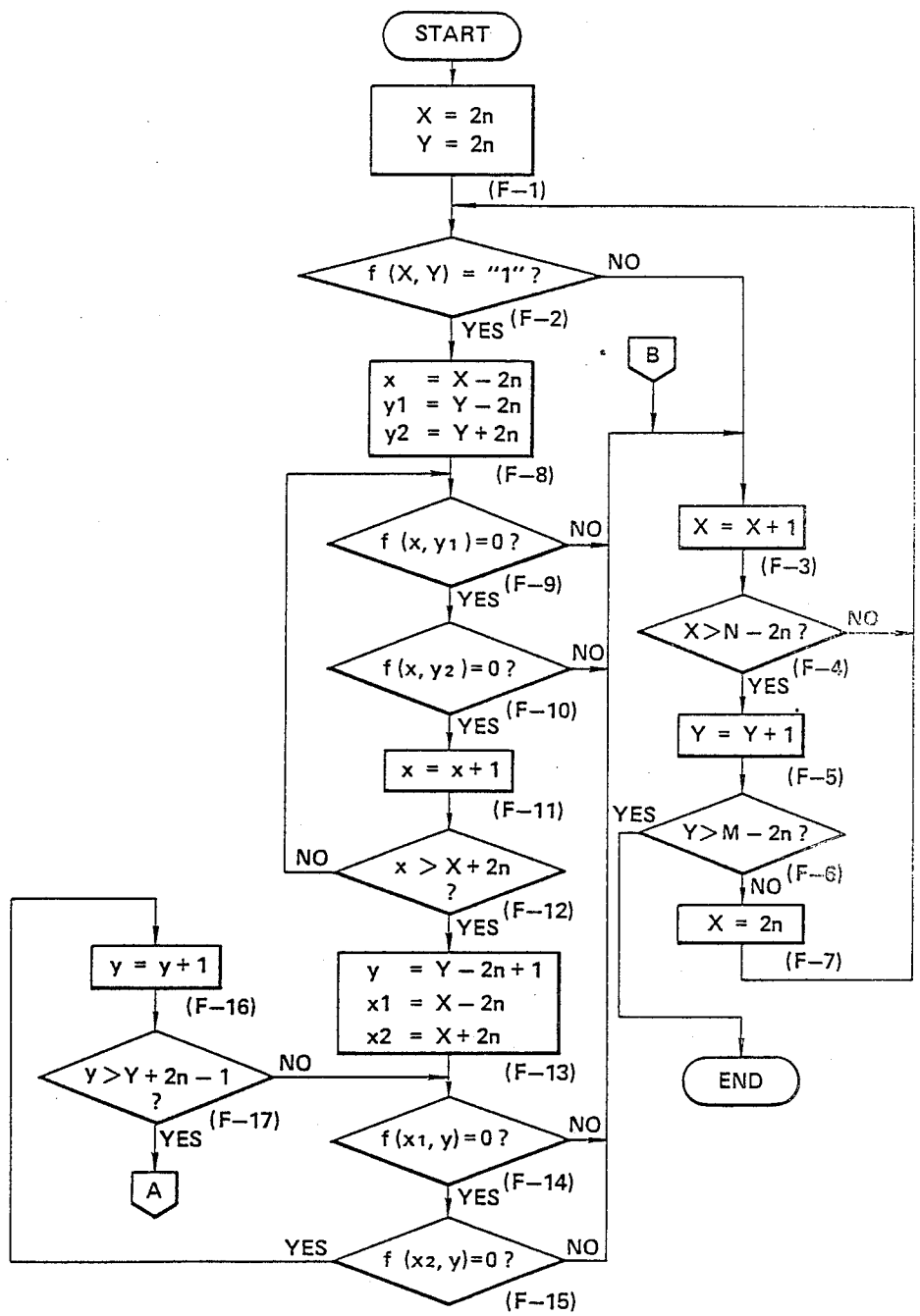
FIG. 11(A) to 11(B) are integrally a processing flowchart of the isolation region eliminating processing.
Figure 11B:
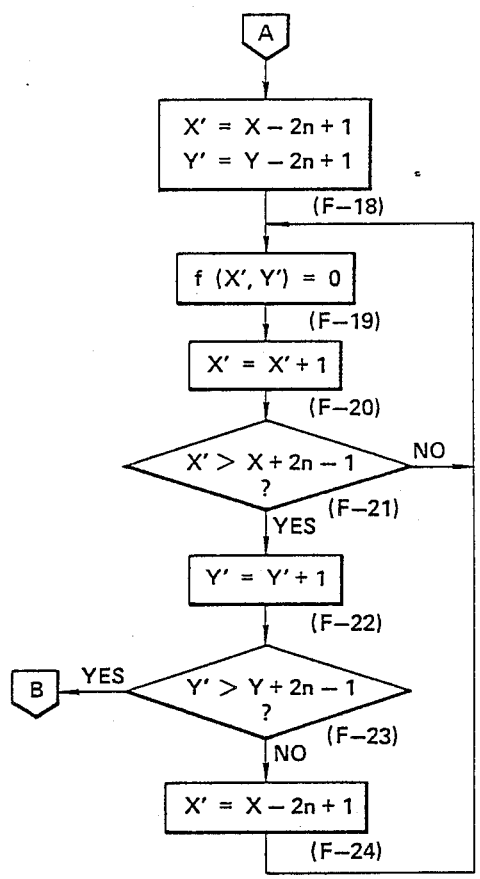
Figure 12:
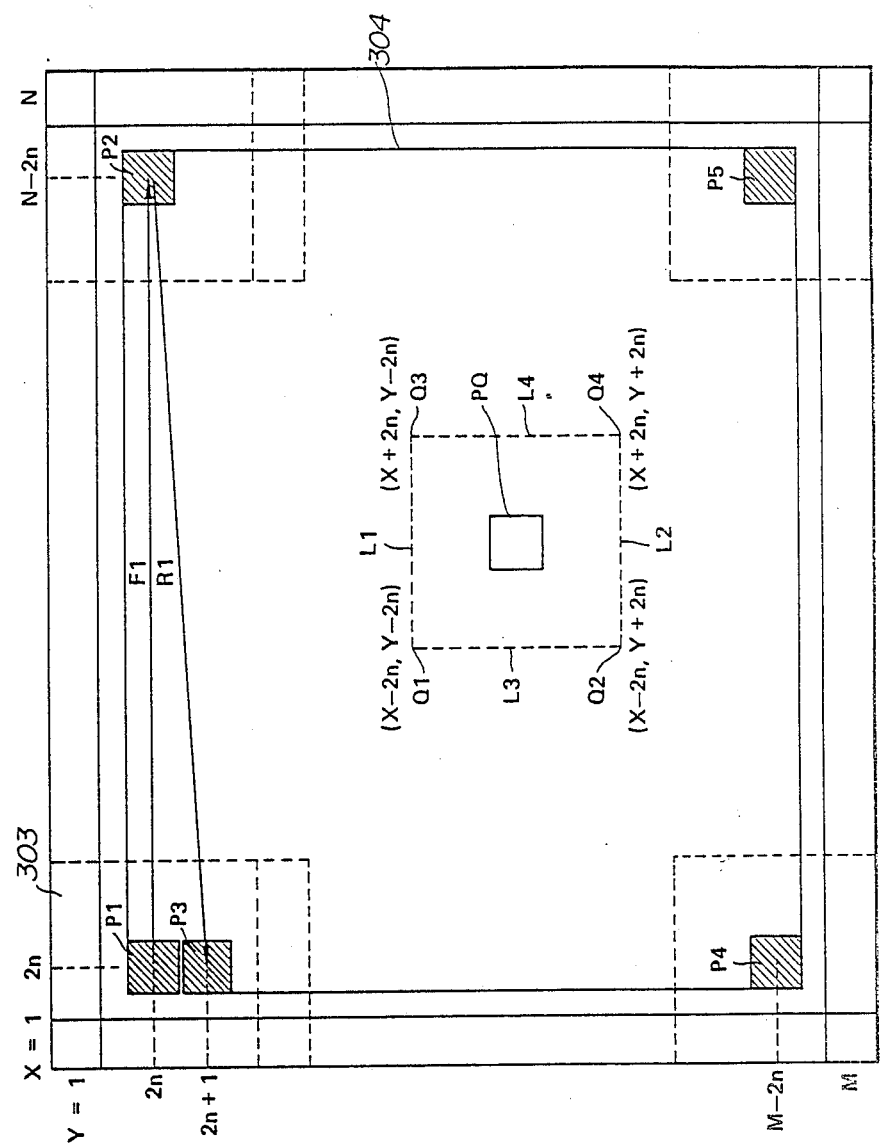
FIG. 12 is a state diagram representing a mask position in the isolation region eliminating processing.

FIGS. 11(A) and 11(B) show integrally a processing flowchart on which the isolation region eliminating part 206 executes when an algorithm of isolation region elimination is applied to the two-dimensional image having M pixels in the longitudinal direction and N pixels in the lateral direction as shown in FIG. 12.

It is noted that although FIGS. 11(A) and 11(B) shows the isolation region eliminating processing for the edge information f(x, y) in the longitudinal direction, the same processing is carried out for the edge information g(x, y) in the lateral direction. In the processing flowchart of FIGS. 11(A) and 11(B), f(x, y) denotes "0" or "1" of the binary-coded density level on the longitudinal edge information at the coordinate value (X, Y) and n denotes a size of the mask 303. In addition, in the algorithm of FIGS. 11(A) and 11(B), the mask 303 is scanned horizontally from a leftmost side of the image of N×M pixels to a rightmost side thereof and then scanned vertically from an upward direction to a downward direction as shown in FIG. 12. Furthermore, an image region in which the part 206 determines whether the isolation region is present or not, i.e., a region in which the part 206 determines whether f(x, y) is "1" or "0" is an inside of the region in which a center point of the mask 303 can be moved, i.e., the inside of the region denoted by numeral 304 in FIG. 12.

In a step (F-1) of FIG. 11(A), an initialization is carried out. In details, the density level f(X, Y) is initially set as follows; X=2n, Y=2n as a center position P1 of the mask to determine whether the density level f(X, Y) is "1" or "0".

In a step (F-2), the part 206 determines whether the density level f(X, Y) of part of the image at the center position Pi of the mask is "1" or not. If the density level f(X, Y) at the pixel corresponding to the center position P1 of the mask is not "1", the routine goes to a step (F-3) in which the center position P1 of the mask is moved by one pixel in a direction denoted by F1 of FIG. 12 (x-axis direction) so that the position of the mask 303 is moved by "1" in the x direction (, i.e., the coordinate value X is incremented by "1") since the part of image to be eliminated is not present at the coordinate value (2n, 2n).

In the next step (F-4), the part 206 determines whether the coordinate value X at the center position of the mask moved in the x direction in the step (F-3) is greater than N−2n (, i.e., X>N−2n). If not (X≦N−2n), the routine returns to the step (F-2) since the center position of the mask moved in the X direction is not more right side than a position P2 shown in FIG. 12, i.e., not more right side than a coordinate value (N−2n, 2n) but within the region denoted by 304. In the step (F-2), the part 206 determines, as described above, whether the density level f(X, Y) at the center position of the moved mask is "1".

On the other hand, if yes (X>N−2n) in the step (F-4), the center position of the mask 303 moved in the x direction exceeds the rightmost side position P2 in FIG. 12, i.e., outside the region 304. Therefore, the center position of mask needs to be set at a head position of the next line, i.e., the position P3 represented by a new coordinate value (2n, 2n+1). Therefore, the routine goes to a step (F-5). In the step (F-5), the y-axis coordinate Y is incremented by "1". In a step (F-6), the part 206 determines whether the incremented coordinate value Y is greater than M−2n. If Y>M−2n, the processing routine is ended since the coordinate value Y is lower than a position P4 shown in FIG. 12, i.e., outside of the region 304 and therefore the scanning by means of the mask 303 is completed. On the other hand, if Y≦M−2n in the step (F-6), the routine goes to a step (F-7) in which the coordinate value X is set to 2n in order to move the center position of mask from the position P2 to P3 as denoted by an arrow R1 of FIG. 12.

The region 304 is, thus, scanned horizontally from the left upmost position vertically to the right downmost position. When the density level f(X, Y) indicates "1" at any one of the coordinate values (X, Y), the routine goes to a step (F-8). The center position of the mask at this time is denoted by PQ in FIG. 12.

In the steps (F-8) to (F-17), the part 206 determines whether the pixel values at the outmost periphery of the mask 303 are all "0"s at a time when the density level f(X, Y) indicates "1" at the center position of mask PQ.

In details, in the step (F-8), x=X−2n, $y_1$ =Y−2n, and $y_2$=Y+2n are defined as coordinate values of pixels on the outmost periphery of the mask 303. The coordinate value (x, $y_1$) is a coordinate $Q_1$ in FIG. 12. The coordinate value (x, $y_2$) is a coordinate $Q_2$ in FIG. 12. In the step (F-9), the part 206 determines whether the density level f(x, $y_1$) at the coordinate value (x, $y_1$) is "0".

If f(x, $y_1$) is not "0" in the step (F-9), the routine goes to the step (F-3) in which the center position PQ is moved to the next position as described above, since a condition for elimination of the isolation region is not satisfied. If f(x, $y_1$) indicates "0" in the step (F-9), the routine goes to step (F-10) in which the part 206 determines whether f(x, $y_2$) indicates "0". If f(x, $y_2$) does not indicate "0" in the step (F-10), the routine returns to the step (F-3) since the condition for elimination of the isolation region is not satisfied. On the other hand, if f(x, $y_2$) indicates "0", the routine goes to the step (F-11) in which the coordinate value x is advanced by "1" in order to determine whether the density levels f(X, Y) on two outmost peripheral lines L1 and L2 of the mask 303 as shown in FIG. 12 indicate "0". Then, such determination processings of eliminating conditions in the steps (F-9) and (F-10) are repeated.

In the step (F-12), the part 206 determines whether the coordinate value x has become greater than X+2n (x>X+2n). The coordinate value x is not on the outmost peripheral lines L1 and L2 of FIG. 12 when the coordinate value x has incremented and become greater than X+2n. Therefore, the determination on the density levels f(X, Y) on the outmost peripheral lines L1 and L2 is ended and the routine goes to the step (F-13). That is to say, when the routine goes to the step (F-13), it means that f(X, Y) satisfies all conditions of "0" on the outmost peripheral lines L1 and L2.

In the step (F-13). y=Y−2n+1, $x_1$=X−2n, and $x_2$=X+2n are defined as the coordinates of pixels at the outmost peripheral points Of the mask 303 in the same way as in the step (F-8). In steps (F-9) and (F-10). the part 206 determines whether the density levels f($x_1$, y) and f($x_2$, y) at the coordinate values ($x_1$, y), ($x_2$, y) indicate "0"s. When, in either of the step (F-14) or step (F-15), neither f($x_1$, y) nor f($x_2$, y) indicates "0", the routine goes to the step (F-3) since the condition for elimination of the isolation region is not satisfied. When both f($x_1$, y) and f($x_2$, y) indicate "0", the routine goes to a step (F-16) to determine whether f(X, Y) indicates "0" in the outmost peripheral lines L3 and L4 of FIG. 12. In a step (F-16), the coordinate value y is incremented by "1". Then, the steps (F-14) and (F-15) are repeated. In a step (F-17), the part 206 determines whether the coordinate value y is greater than Y+2n−1 (y>Y+2n−1). When y≧Y+2n−1, the coordinate value y is not on the outmost peripheral lines L3 and L4. Therefore, after the completion of determination of f(X, Y) on the outmost peripheral lines L3 and L4, the routine goes to a step (F-18). That is to say, if the routine advances the step (F-18), f(X, y) on the outmost peripheral lines L1, L2, L3, and L4 of the mask 303 satisfies condition of all "0"s. The region of f(X, y) indicating "1" means the isolation region. Hence, in the steps (F-18) to (F-24), all pixel values in the mask 304 enclosed with the outmost peripheral lines L1, L2, L3, and L4 are turned to "0"s.

In the step (F-18), X'=X−2n+1 and Y'=Y−2n+1 are initialized as initial values of the coordinate values within the mask 303. Then, in the step (F-19), the density level at the initialized coordinate value, i.e., the pixel value f(X', Y') is turned to "0". Next, in the step (F-20), the coordinate value X' is incremented by "1". In the step (F-21), the part 206 determines whether the coordinate value X' is greater than X+2n−1. If the coordinate value X' is greater than X+2n−, the routine returns to the step (F-19). In the step (F-19), all pixel values f(X', Y') for One line in the mask 303 are turned to "0"s. When the coordinate value X' is greater than X+2n−1 in the step (F-21), it means that the processing of the pixel value (X', Y') for one line in the mask 303 is ended. Therefore, the routine goes to steps (F-22) to (F-24) in which all pixel values f(X', Y') of the next line within the mask 303 are turned to "0"s.

In the step (F-22), the coordinate value Y' is incremented by "1". In the step (F-23), the part 206 determines whether the coordinate value Y' is greater than Y+2n−1. When Y' is greater than Y+2n−1, the routine goes to the step (F-24) to turn all pixel values f(X', Y') of lines in the mask indicated by the coordinate value Y'. In the step (F-24), the coordinate value X' is set to X−2n+1 (first row in the mask). The routine again returns to the step (F-19). The processings of steps (F-19) to (F-24) are repeated. Consequently, when the coordinate value Y' in the step (F-24) is greater than Y+2n−1, all pixel values f(X', Y') within the mask 303 with the position PQ as a center indicate "0"s. Since the elimination of isolation region on the edge information at this position is completed, the routine again returns to the step (F-3) to eliminate the isolation region at the next mask position. In this way, when the center position of the mask 303 is moved to the position indicated by P5 in FIG. 12, the processing on the isolation region elimination for the edge information of N×M pixels has been completed when the center position of the mask 303 is moved by the position denoted by P5 in FIG. 12.

The longitudinal edge information f(x, y) and lateral edge information g (x, y) in both of which the isolation regions are eliminated by means of the isolation region eliminating part 206 as described above are stored in the image memories 207, and 208, respectively.

Since the vanishing point detecting section 103 carries out the eliminations of points weak in the edge intensity, fine linearization, and eliminations of isolating regions, the detection accuracy of the vanishing point can be enhanced as will be described later due to the elimination of effects on noise or weak edge not contributing to the detection of vanishing point.

Next, the edge direction calculating part 209, with reference to values of respective pixels stored in the image memories 207 and 208, calculates a gradient of the edge on the respective coordinates. That is to say, when one pixel value f(X, Y) indicates "0" at the coordinate value (X, Y) of the image memory 207 and the pixel value g(X, Y) at the coordinate value (X, Y) of the image memory 208 indicates "1", the gradient (direction) of the edge at the coordinate value (X, Y) is horizontal. When the coordinate value f(X, Y) indicates "1" at the coordinate value (X, Y) of the image memory 208, the gradient (direction) of the edge at the coordinate value (X, Y) is vertical when the pixel value g(X, Y) at the coordinate value (X, Y) of the image memory 208 indicates "0". It is noted that although the above-described edge direction calculating part 209 calculates the edge direction with only one coordinate value (X, Y) taken into account, the calculated edge in this way takes the gradient value macroscopically of only either of horizontal or vertical one.

If the gradient of the edge is desired microscopically to be derived, a length $\Delta x$ of a continuous segment in the x-axis direction and a length $\Delta y$ of a continuous segment in the y-axis direction are derived from the pixel values f(X, Y) and g(X, Y) at the coordinate value (X, Y) and pixel values at eight coordinate values (X+1, Y+1), (X, Y+1), (X−1, Y+1), (X+1, Y), (X−1, Y), (X+1, Y−1), (X+1, Y−1), (X, Y−1), and (X−1, Y−1) which are in the vicinity of (, i.e., surrounding) the coordinate value (X, Y). Thus, the gradient of the edge can be derived as $\Delta y/\Delta x$. If $\Delta y/\Delta x > 0$, the edge has the gradient of an acute angle with respect to a horizontal line in a counterclockwise direction. If $\Delta y/\Delta x < 0$, the edge has the gradient of an obtuse angle with respect to the horizontal line in the counterclockwise direction.

The straight line generating part 210 generates such straight lines as those passing through the coordinate value (X, Y) and having the gradient calculated by the edge direction calculating part 209.

Figure 13A:
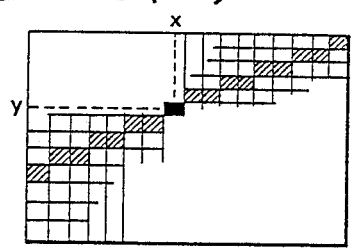
FIG. 13(A) is a schematic diagram of a straight line generated by a straight line generating part.
Figure 13B:
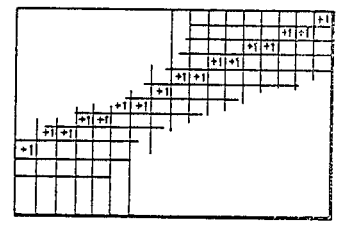
FIG. 13(B) is a schematic diagram for explaining a method for accumulating straight lines.

FIG. 13(A) shows an example of the straight lines generated in the line generating part 210. The generated straight lines as shown in FIG. 13(A) are accumulated in the subsequent stage of straight line accumulating part 211 by increasing the accumulated value before the passage point of the straight line by "1" as shown in FIG. 13(B). The updated accumulated value is stored in the image memory 212.

Figure 14:
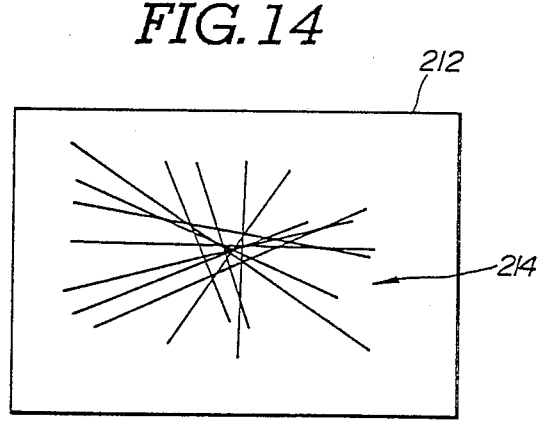
FIG. 14 is a schematic diagram of a straight-line accumulated image derived through straight line generation and accumulation.

The processings of the straight line generation and straight line accumulation are carried out for all points constituting the edge so that a straight line accumulated image 214 as shown in FIG. 14 is finally stored in the image memory 212. That is to say, the accumulated value G(X, Y) of the coordinate value (X, Y) in the image memory 212 represents the number of straight lines passing through the coordinate value (X, Y).

As described above, the vanishing point is the point on which the parallel edge groups associated with the depth of the object are concentrated when the rectangular solid object is photographed in the two-dimensional image under the perspective projection method. The vanishing point may be determined to be only one point in the case of the generally shaped object. Hence, in the vanishing point calculating part 213, a point at which the accumulated value is the highest, i.e., at which the number of straight lines passing therethrough is greatest is determined to be the vanishing point.

Figure 15:
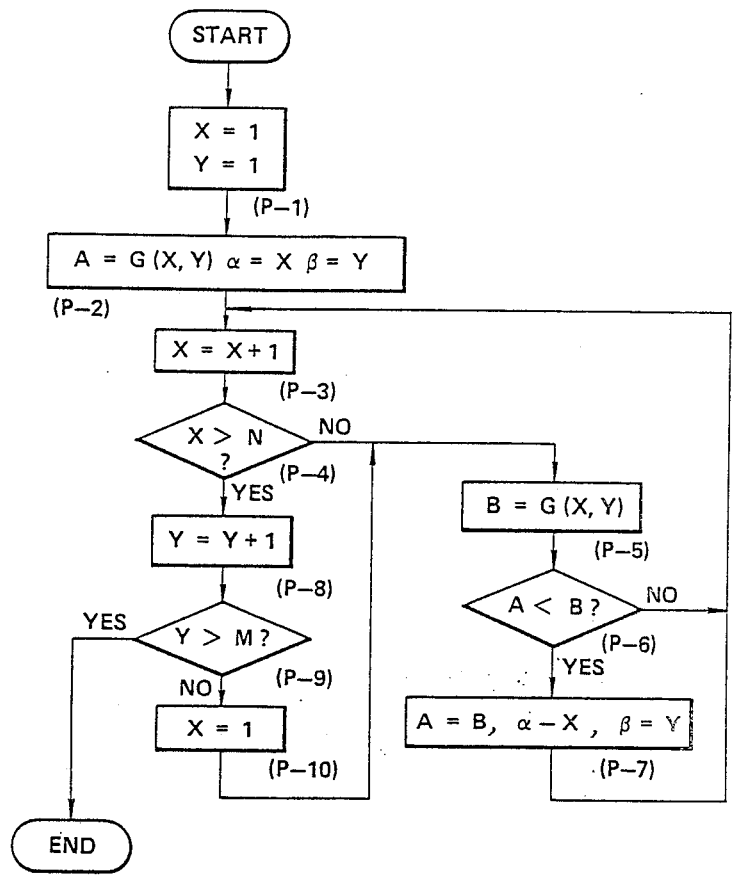
FIG. 15 is a processing flowchart of a vanishing point detection processing.

FIG. 15 shows a flowchart on which the vanishing point calculating part 213 executes.

In the flowchart of FIG. 15, the image memory 212 has N pixels in the lateral direction and M pixels in the longitudinal direction. The accumulation in the coordinate (X, Y) of the image memory 212 is represented by G(X, Y).

In a step (P-1), the part 213 initializes the coordinate value (X, Y) to (1, 1) to start to search the initial coordinate value (1, 1) in the image memory 212 for the coordinate value (X, Y) at which the maximum accumulated value G(X, Y) is provided. In a step (P-2), the part 213 supposes that the accumulated value G(X, Y) at the coordinate value (X, Y), i.e., at the coordinate value (1, 1) the accumulated value is A and the coordinate value (1, 1) corresponds to the coordinate value ($\alpha$, $\beta$) of the vanishing point.

In a step (P-3), the coordinate value X is incremented by "1". In a step (P-4), the part 213 determines whether the coordinate value X is greater than the number of pixels N in the lateral direction of the image memory 212. When the coordinate value X is smaller than the number of pixels N in the lateral direction, the routine goes to a step (P-5). Suppose that the accumulated value G(X, Y) at the coordinate value (X, Y) in this routine is B. In a step (P-6), the part 213 compares the magnitude between the accumulated value A at the previous coordinate value and the accumulated value B at the present coordinate value B. If the accumulated value B is not larger than that A, the present accumulated value A is an accumulated value to be a reference to the subsequent comparison. Therefore, without processing for the accumulated value the routine returns to the step (P-3). In the step (P-3), the part 213 derives the accumulated value B at the next coordinate value (X, Y). If, in the step (P-6), the accumulated value B is again greater than the accumulated value A, the present accumulated value A is updated by the accumulated value B and the routine goes to the step (P-7) to provide the next comparison reference. In details, the present accumulated value A is replaced with the accumulated value B. The coordinate value (X, Y) of the accumulated value B is the coordinate value ($\alpha$, $\beta$) of the vanishing point. Next, the routine returns to the step (P-3) in which the accumulated value B is derived at the next coordinate value (X, Y). The determination processings of the steps (P-6) and (P-7) are repeated.

The processing from the step (P-3) to the step (P-7) is repeated until the coordinate value X is greater than the number of pixels N in the lateral direction. When, in the step (P-4), the part 213 determines that the coordinate value X is greater than the number of pixels N in the lateral direction, the maximum accumulated value A and its coordinate value are derived for one line of the image memory 212. The routine then goes to the step (P-8) to compare the coordinate value with the accumulated value G(X, Y) of the next line. That is to say, the present coordinate value Y is incremented by "1" in the step (P-8). In the next step (P-9), the part 213 determines whether the coordinate value Y is greater than the number of pixels M in the longitudinal direction. If the coordinate value Y is not larger than the number of pixels M in the longitudinal direction, the routine goes to the step (P-10) in which the coordinate value X is turned to "1" and goes to the step (P-5) to check to see whether each pixel of the line of the presently updated coordinate value Y indicates the maximum accumulated value. In the step (P-5), the same processing as described above is repeated. It is noted that an initial value of the accumulated value A which serves as the reference to the comparison is the maximum accumulated value at each pixel of the previous line.

In the way described above, the series of processings starting from the step (P-3) and ended at the step (P-10) is repeated to determine whether the accumulated value of each pixel on the next and next line indicates the maximum. Then, when, in the step (P-9), the coordinate value Y becomes greater than the number of pixels M in the longitudinal direction, the processing is ended. That is to say, since at this time the part 213 compares and determines whether all pixels within the image memory 212 indicate maximum. The maximum accumulated value is represented as the accumulated value A in the step (P-7) and the coordinate value (X, Y) at this time is derived as the coordinate value ($\alpha$, $\beta$) of the vanishing point.

In this way, the coordinate value ($\alpha$, $\beta$) providing the maximum accumulated value A can be determined as the vanishing point.

Since, in the vanishing point detecting Section 103, the straight line accumulated value in which all straight lines passing through all edge constituting points within the image and having gradients given by the edge directions at those points are stored in the image memory 212 as the straight line accumulated image 214 shown in FIG. 14 and the coordinate value (X, Y) which provides the maximum straight-line accumulated value within the image memory 212 is detected as the coordinate value ($\alpha$, $\beta$) of the vanishing point, the time required to detect the vanishing point can be shortened due to elimination of any conversion processing for the straight lines derived from the gradient of the edge.

Next, the modification of the vanishing point detecting section 103 will be described with reference to FIGS. 16 to 18.

Figure 16:
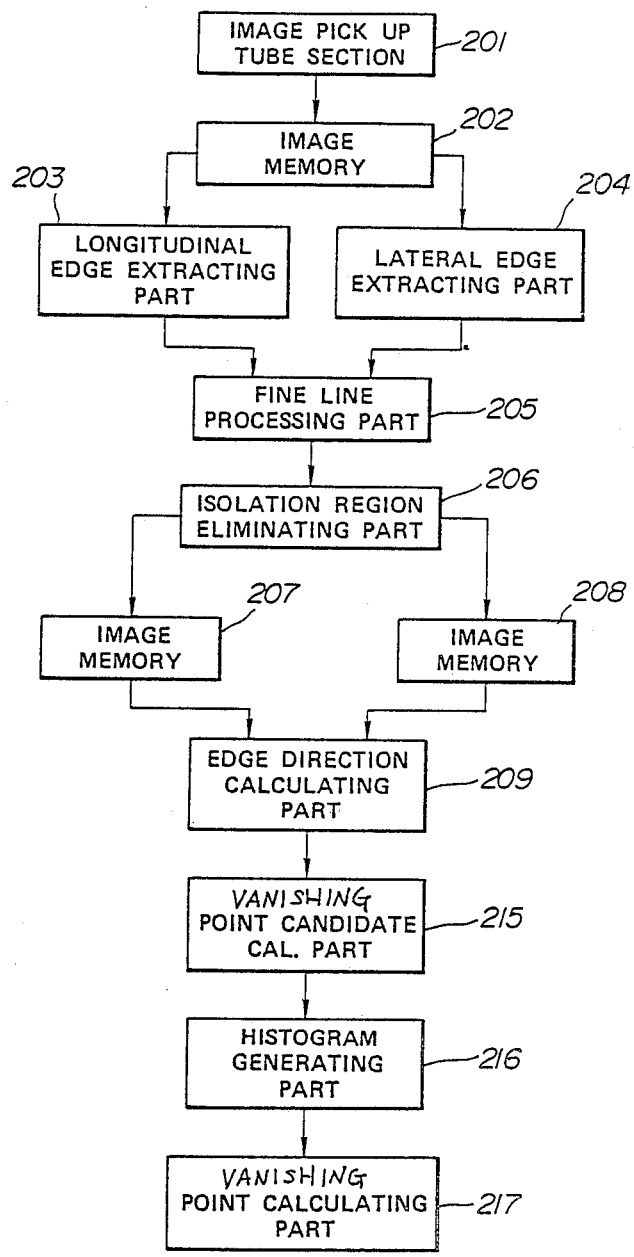
FIG. 16 is a simplified functional block diagram of a modification of the vanishing point detection section.

FIG. 16 shows a functional block diagram of the modification of the vanishing point detecting section 103.

It is noted that since the same numerals in FIG. 16 as those shown in FIG. 7 designate corresponding elements, the detailed descriptions on those elements are omitted here.

In the modification of the section 103 in FIG. 16, a vanishing point candidate calculating part 215, histogram generating part 216, and vanishing point calculating part 217 are installed in place of the straight line generating part 210, straight line accumulating part 211, image memory 212, and vanishing point calculating part 213.

The vanishing point candidate calculating part 215 calculates a candidate point for the vanishing point using the edge constituting point information on the calculated edge direction by the edge direction calculating part 209. The histogram generating part 216 generates the histogram at a horizontal direction position from the calculated vanishing point candidate point. The vanishing point calculating part 217 determines the vanishing point position.

Suppose that in the modification of vanishing point detecting section 103 the camera of the image pick up tube section 201 is placed horizontally, the vanishing point of horizontal line group of, e.g., a three-dimensional object should be placed on a horizontal line of the two-dimensional image, e.g., on a center line thereof.

Figure 17:
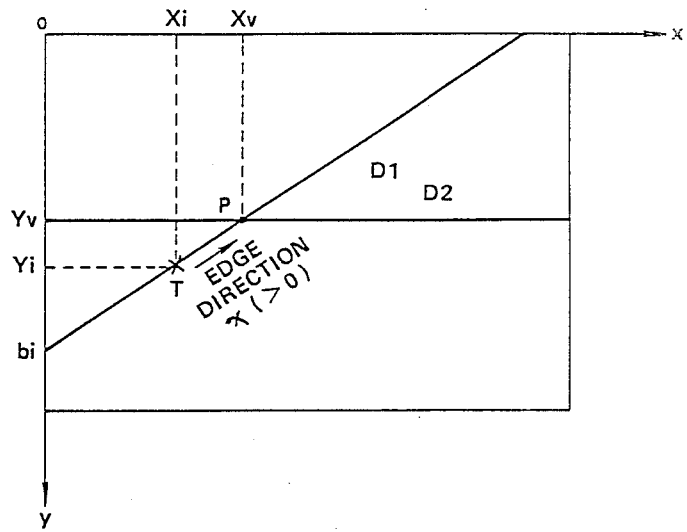
FIG. 17 is a schematic diagram for explaining a method for calculating vanishing candidate points by means of a vanishing candidate point calculating part 20 shown in FIG. 16.

That is to say, suppose one of points $T(x_i, Y_i)$ constituting the edge detected by the longitudinal edge extracting part 203 and lateral edge extracting part 204 in FIG. 17. An intersection p between a straight line D1 passing through the point T and having a gradient given by the edge direction ($x = \Delta y/\Delta x$) at the point T and a straight line D2 in the lateral direction expressed as $y = Y_v$ should become the vanishing-point candidate. The x-axis coordinate value $x_v$ of the intersection P is uniformly derived in the following equation.

That is to say, the y-axis coordinate value $y_i$ at the point T is expressed as follows:

$$y_i = -\chi x_i + b_i$$

Then, an intercept $b_i$ is expressed as follows:.

$$b_i = y_i + \alpha x_i$$

In addition, a gradient $\chi$ of the edge is expressed as follows:

$$\chi = (b_i - Y_v)/x_v$$

Therefore, the x coordinate $x_v$ at the intersection P can be derived as follows:

$$x_v = (b_i - Y_v)/\chi = (y_i + \chi x_i - Y_v)/\chi$$

Care should be exercised that although the edge direction calculated by the edge direction calculating part 209 in FIG. 17 is positive, the gradient of the straight line at the point T is negative. In this way, the above-described processing is carried out for all points constituting the edge in the vanishing point candidate calculating part 215 so that n number of vanishing point candidates $(x_{vi}, Y_v)$ (i = 1 to n) are calculated.

The histogram generating part 216 generates the histogram on the x-axis coordinate value $x_{vi}$ of the vanishing point candidates $(x_{vi}, Y_v)$. Thus, the histogram shown in FIG. 18 is generated.

Figure 18:
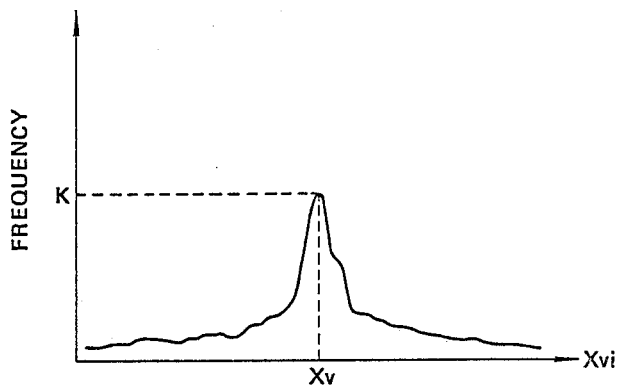
FIG. 18 is a histogram of a vanishing candidate point generated by means of a histogram generating part.

The vanishing point calculating part 217 derives x-axis coordinate value $X_v$ providing a maximum value of, e.g., a frequency K on the basis of the generated histogram shown in FIG. 18. The x-axis coordinate value of $X_v$ is determined to be the x-axis coordinate value of the vanishing point. The coordinate value of the vanishing point is thereby determined as $(X_v, Y_v)$.

In the modification shown in FIG. 16, it is effective when the vanishing point detecting section 103 already recognizes that the vanishing point is present on a predetermined line. In this case, the intersection between the predetermined line and straight line drawn in the edge direction defined by one of edge constituting points is derived as one of the vanishing point candidates. Then, the coordinate value providing the maximum frequency value on a frequency distribution of the intersections as shown in FIG. 18 is detected as the coordinate value of the real vanishing point. Therefore, the detection of the vanishing point can quickly be carried out with high possibility.

As described above, in the movement direction and position detecting system according to the present invention the position, the vanishing point of the photographed image and position(s) of the passage end(s) are detected. Then, the movement direction of the unmanned vehicle is calculated from the detected vanishing point position and the distance from the detected passage end to the unmanned vehicle is calculated from the detected position of the passage end. Therefore, since the direction and position of the unmanned vehicle can accurately and quickly be detected without use of markers installed on the running road surfaces or wall surfaces, it is not necessary to newly install such markers when the layout within the factory is modified or new part of the factory is extended. Consequently, general purpose utilization and reduced installation cost can be achieved. In addition, the maintenance cost and difficulty can be reduced.

Furthermore, since in the unmanned vehicle movement direction and position calculating system the vanishing point calculating section exemplified above is adopted in which the straight line generated on the basis of the edge direction is accumulated and the position at which the maximum accumulated value is provided is detected as the vanishing point position, the accuracy and speed of detecting the vanishing point can remarkably be improved. Consequently, it becomes possible to increase the identifying speed for a target object on the background image and to carry out a speedy control for running of the unmanned vehicle.

It will fully be understood by those skilled in the art that the foregoing description has been made in terms of the preferred embodiment and various changes and modifications may be made without departing from the scope of the present invention which is to be defined by the appended claims.

WHAT IS CLAIMED IS:

1. A system for calculating movement direction and position of a movable object, comprising:
   (a) first means for photographing a background of the movable object in a direction of which the movable object moves;
   (b) second means for detecting a vanishing point from a photographed background two-dimensional image derived by the first means;
   (c) third means for detecting a position of an end of a passage on which the movable object is to move from the photographed background image derived by the first means;
   (d) fourth means for calculating a direction of the movable object from a position of the vanishing point detected by the second means; and
   (e) fifth means for calculating a distance of the movable object from the position of the passage end detected by the third means on the basis of the detected position of the passage end and vanishing point.

2. The system as recited in claim 1, which further comprises sixth means for controlling the movement direction and position of the movable object on the basis of the calculated forwarding direction and distance of the movable object by the fourth and fifth means.

3. The system as recited in claim 1, wherein the first means comprises a video camera having a lens of a focal distance (f) and the fourth means calculates the forwarding direction ($\theta$) the movable object using the following equation:

$$\theta = \tan^{-1} \frac{q\left(X - \frac{N}{2}\right)}{f}$$

wherein q denotes a lateral size of a pixel of the photographed image when a longitudinal size of the pixel is denoted by p, X denotes an X-axis coordinate of the detected vanishing point when a Y-axis coordinate of the detected vanishing point is denoted by Y, and N denotes the number of pixels in the lateral direction of the photographed image when the number of pixels in the longitudinal direction thereof is denoted by M pixels.

4. The system as recited in claim 3, wherein the fifth means reads an X-axis coordinate ($X_A$) representing the position of the detected passage end on a lowermost stage line of the photographed image and calculates the distance ($W_1$) using the following equation:

$$W_1 = \frac{q(X - X_A)(h - f\sin\delta)\cos\frac{\omega_r}{2}\cos\theta}{f\sin\left(\frac{\omega_r}{2} + \delta\right)}$$

wherein h denotes a height o the video camera with respect to a floor, $\omega_r$ denotes a vertical picture angle of the video camera lens, and $\delta$ denotes a depression angle of the video camera lens.

5. The system as recited in claim 4, wherein the third means detect the position of another end of the passage opposite to the end with respect to the movable object and wherein the fifth means another X-axis coordinate ($X_C$) representing the position of the detected other passage end on the lowermost stage line of the photographed image and calculates the distance ($W_2$) using the following equation:

$$W_2 = \frac{q(X_C - X)(h - f\sin\delta)\cos\frac{\omega_r}{2}\cos\theta}{f\sin\left(\frac{\omega_r}{2} + \delta\right)}$$

6. The system as recited in claim 2, wherein the movable object is an unmanned vehicle automatically moving from one working station to another working station in a factory.

7. The system as recited in claim 1, wherein the second means comprises:
   (a) sixth means for extracting an edge information from the photographed image in the first means and calculating a direction of the edge;
   (b) seventh means for generating a straight line on the basis of the edge direction calculated by the sixth means and accumulating the generated straight line to provide a straight line accumulated image; and
   (c) eighth means for detecting a position as the vanishing point at which a maximum accumulated value is given from the accumulated straight line accumulated image.

8. The system as recited in claim 7, wherein the sixth means comprises:
   (a) a longitudinal edge extracting part for extracting a longitudinal edge component from the photographed two-dimensional image;

(b) a lateral edge extracting part for extracting a lateral edge component from the photographed two-dimensional image;

(c) a fine linearizing processing part for linearing the edge extracted by the longitudinal and lateral edge extracting parts into a fine line;

(d) an isolation region eliminating part for eliminating an isolation region of image from the image after the edge is linearized into the fine line by means of the fine linearizing part;

(e) a first image memory for storing the image in which the fine linearization and isolation region elimination are carried out for the extracted longitudinal edge by the longitudinal edge extracting part;

(f) a second image memory for storing the image in which the fine linearization and isolation region elimination are carried out for the extracted lateral edge by the lateral edge extracting part; and (g) an edge direction calculating part for calculating the edge directions for all points constituting the edge stored in the first and second image memories.

9. The system as recited in claim 8, wherein the longitudinal edge extracting part applies longitudinal edge extracting differential operators to the photographed two-dimensional image to derive a change in density values in the lateral direction of the photographed two dimensional image, carries out a density transformation for a data of the density value change, eliminates parts of the density-transformed density value change data which are weak in an edge intensity, and carries out a binary coding for the density-transformed density value change data whose parts weak in the edge intensities are eliminated to generate a binary-coded longitudinal edge image.

10. The system as recited in claim 9 wherein the lateral edge extracting part applies lateral edge extracting differential operators to the photographed two-dimensional image to derive a change in density values in the longitudinal direction of the photographed two dimensional image, carries out a density transformation for a data of the density value change, eliminates parts of the density-transformed density value change data which are weak in an edge intensity, and carries out a binary coding for the density-transformed density value change data whose parts weak in the edge intensities are eliminated to generate a binary-coded lateral edge image.

11. The system as recited in claim 10, wherein the fine linearizing processing part linearizes the longitudinal edge image and lateral edge image extracted by the longitudinal edge extracting part and lateral edge extracting part into the fine line and extract substantially center lines of the longitudinal edge image and lateral edge image each having a given width to take out edge information having a width of "1".

12. The system as recited in claim 11, wherein the isolation region eliminating part sets a mask having predetermined longitudinal and lateral lengths and replaces pixel values in the mask with all "0"s when pixel values on an outmost periphery of the mask are all "0"s.

13. The system as recited in claim 12, wherein the edge direction calculating part calculates a gradient of the edge at each pixel from the binary-coded and fine linearized longitudinal edge information and lateral edge information stored in the first and second image memories.

14. The system as recited in claim 13, wherein the seventh means comprises a straight line generating part which generates straight line having the gradient which corresponds to the gradient of the edge at each pixel calculated by the edge direction calculating part.

15. The system as recited in claim 14, wherein the seventh means generates the straight line through a given algorithm called a Digital Differential Analizer.

16. The system as recited in claim 14, wherein the seventh means further comprises a straight line accumulating part for adding "1" to an accumulated value before a passage point of the generated straight line so that the straight line is accumulated and a third image memory for storing the result of the accumulation of the straight line accumulating part.

17. The system as recited in claim 16, wherein the eighth means detects one of the passage points of the accumulated straight lines which has a largest accumulated value as the vanishing point.

18. The system as recited in claim 9, wherein the longitudinal edge extracting part applies the longitudinal edge extracting differential operators expressed as follows to the photographed two-dimensional image represented by h(x, y):

| "1" | "0" | "1" |
|---|---|---|
| "2" | "0" | "2" |
| "−1" | "0" | "1" | so that the result thereof is expressed as; h (x+1, y+1) +2h (x+1, y)+h (x+1, y+1)−h (x−1, y+1) +2h (x+1, y)+h (x+1, y+1)−h )x−1, y+1)−2h (x−1, y)−h (x−1, y−1), thereby the density value change in the longitudinal (x-axis direction) direction of the photographed two-dimensional image h (x, y) can be derived, the density value change therein representing the intensity of the longitudinal edge within the photographed two-dimensional image.

19. The system as recited in claim 10, wherein the lateral edge extracting part applies the lateral edge extracting differential operators expressed as follows to the photographed two-dimensional image represented by h (x, y):

| "−1" | "−2" | "−1" |
|---|---|---|
| "0" | "0" | "0" |
| "1" | "2" | "1" | so that the result thereof is expressed as; h(x−1, y−1) +2h (x, y−1)+h (x+1, y+1)−h (x−1, y+1)−2h (x, y+1)−h (x+1, y+1), thereby the density value change in the lateral (y-axis direction) direction of the photographed two-dimensional image h (x, y) can be derived, the density value change therein representing the intensity of the lateral edge within the photographed two-dimensional image.

20. The system as recited in claim 18, wherein each pixel of the photographed two-dimensional image derived from the first means has an eight-bit image information and the longitudinal edge extracting part carries out the density transformation for the data of the density value change in such a way that if an output after the application of the longitudinal edge extracting differential operators to the photographed two-dimensional image is F (x, y), the F (x, y) is transformed through the density transformation into $\hat{F}(x, y) = (F(x, y) + 1024)/8$.

21. The system as recited in claim 20, wherein the longitudinal edge extracting part eliminates predetermined parts in an edge intensity range which are represented by "120" to "136" after the density transformation by turning all density values of pixels which fall in the predetermined parts to "0"s.

22. The system as recited in claim 21, wherein the longitudinal edge extracting part carries out the binary coding with a predetermined threshold so as to generate the longitudinal edge image having a binary-coded level of either "0" or "1".

23. The system as recited in claim 21, wherein the edge direction calculating part derives the edge direction depending on whether one pixel value $f(X, Y)$ at a coordinate value $(X, Y)$ in the first image memory indicates "0" and one pixel value $g(x, y)$ at the coordinate value $(X, Y)$ in the second image memory indicates "1".

24. The system as recited in claim 21, wherein the edge direction calculating part derives the edge direction on the basis of one pixel value $f(X, Y)$ at a coordinate value $(X, Y)$ in the first image memory, one pixel value $g(X, Y)$ at the coordinate value $(X, Y)$ in the second image memory, and pixel values at coordinate values surrounding the coordinate value $(X, Y)$.

25. The system as recited in claim 1, wherein the second means comprises:
    (a) a longitudinal edge extracting part for extracting a longitudinal edge component from the photographed two-dimensional image;
    (b) a lateral edge extracting part for extracting a lateral edge component from the photographed two-dimensional image;
    (c) a fine linearizing processing part for linearizing the edge extracted by the longitudinal and lateral edge extracting parts into a fine line;
    (d) an isolation region eliminating part for eliminating an isolation region of image from the image after the edge is linearized into the fine line by means of the fine linearizing part;
    (e) a first image memory for storing the image in which the fine linearization processing and isolation region elimination processing are carried out for the longitudinal edge extracted by the longitudinal edge extracting part;
    (f) a second image memory for storing the image in which the fine linearization processing and isolation region elimination are carried out for the extracted lateral edge by the lateral edge extracting part;
    (g) an edge direction calculating part for calculating the edge directions for all points constituting the edge stored in the first and second memories;
    (h) a vanishing point candidate calculating part for calculating vanishing point candidates using information on all points constituting the edge having the calculated edge directions;
    (i) a histogram generating part for generating a histogram on a predetermined direction position of the calculated vanishing point candidates; and
    (j) a vanishing point calculating part for determining the vanishing point position on the basis of the generated histogram.

26. The system as recited in claim 25, wherein the vanishing point candidate calculating part derives an intersection between a predetermined line and a straight line in the edge direction derived from each point constituting the edge as one of the vanishing point candidates, the histogram generating part generates the histogram representing a frequency distribution of intersections for all points constituting the edge, and the vanishing point calculating part determines a coordinate value of one of the intersections distributed in the histogram with respect to the frequency which gives a maximum frequency as the coordinate value of the vanishing points.

27. The system as recited in claim 26, wherein the predetermined line is on a horizontal direction of the edge information image in the edge direction calculating part.

28. A system for calculating movement direction and position of an unmanned conveying vehicle automatically moving within a limited space, the system comprising:
    (a) first means for photographing a background of the limited space viewed from the unmanned vehicle in a direction of which the unmanned vehicle moves;
    (b) second means for detecting a vanishing point from a photographed background two-dimensional image derived by the first means;
    (c) third means for detecting positions of side ends of a passage on which the unmanned vehicle is to move from the photographed image derived by the first means;
    (d) fourth means for calculating a moving direction of the unmanned vehicle from a position of the vanishing point detected by the second means; and
    (e) fifth means for calculating each distance of the unmanned vehicle from the side ends of the passage detected by the third means on the basis of the detected positions of the side ends and vanishing point.

29. A method for calculating movement direction and position of a movable object within a limited space, the method comprising the steps of:
    (a) photographing a background of the limited space viewed from the movable object in a direction of which the movable object moves;
    (b) detecting a vanishing point from a photographed background image derived in the step (a);
    (c) detecting positions of side ends of a passage on which the movable object is to move from the photographed image derived in the step (a); and
    (d) calculating a moving direction of the movable object from a position of the vanishing point detected in the step (b) and each distance of the movable object from the side ends of the passage detected in the step (c) on the basis of the detected positions of the side ends and vanishing point.

* * * * *